United States Patent
Saeki

(10) Patent No.: US 11,017,182 B2
(45) Date of Patent: May 25, 2021

(54) LANGUAGE TRANSLATION BY DIVIDING CHARACTER STRINGS BY FIXED PHASES WITH MAXIMUM SIMILARITY

(71) Applicant: Panasonic Intellectual Property Management Co., Ltd., Osaka (JP)

(72) Inventor: Natsuki Saeki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 92 days.

(21) Appl. No.: 16/286,497

(22) Filed: Feb. 26, 2019

(65) Prior Publication Data

US 2019/0197117 A1 Jun. 27, 2019

Related U.S. Application Data

(63) Continuation of application No. PCT/JP2017/036743, filed on Oct. 11, 2017.

(30) Foreign Application Priority Data

Feb. 7, 2017 (JP) .............................. JP2017-020539

(51) Int. Cl.
*G06F 40/45* (2020.01)
*G06F 40/289* (2020.01)
(Continued)

(52) U.S. Cl.
CPC ............ *G06F 40/58* (2020.01); *G06F 40/131* (2020.01); *G06F 40/289* (2020.01); *G06F 40/42* (2020.01); *G06F 40/47* (2020.01)

(58) Field of Classification Search
CPC .......... G06F 40/40; G06F 40/42; G06F 40/45; G06F 40/51; G06F 40/58; G06F 40/279; G06F 40/284; G06F 40/289; G06F 40/47
(Continued)

(56) References Cited

U.S. PATENT DOCUMENTS 5,029,084 A * 7/1991 Morohasi ................ G06F 40/53
704/9
5,606,498 A * 2/1997 Maruta ................... G06F 40/30
704/7
(Continued)

FOREIGN PATENT DOCUMENTS

JP 2006-018354 1/2006
JP 5039114 B 10/2012

OTHER PUBLICATIONS

International Search Report of PCT application No. PCT/JP2017/036743 dated Dec. 5, 2017.

*Primary Examiner* — Martin Lerner
(74) *Attorney, Agent, or Firm* — McDermott Will and Emery LLP

(57) ABSTRACT

A translation device includes a character string output unit, a fixed phrase acquisition unit, a matching unit, a division processor, and a translation result output unit. The character string output unit outputs a plurality of character strings each configuring at least part of text in a first language and including a head character of the text, in order of character string length. The fixed phrase acquisition unit acquires a fixed phrase in the first language associated with a translation phrase in a second language. The matching unit calculates a similarity between each of the character strings and the fixed phrase in order of the character string length. The division processor divides the text at a position achieving a maximum similarity among values of the similarity exceeding a first threshold. The translation result output unit outputs the translation phrase as translation of the text thus divided.

10 Claims, 12 Drawing Sheets

(51) Int. Cl.
*G06F 40/47* (2020.01)
*G06F 40/58* (2020.01)
*G06F 40/42* (2020.01)
*G06F 40/131* (2020.01)

(58) Field of Classification Search
USPC ............ 704/2, 3, 4, 7, 277, 5; 715/264, 265
See application file for complete search history.

(56) References Cited

U.S. PATENT DOCUMENTS

| | | | | |
|---|---|---|---|---|
| 6,098,035 | A * | 8/2000 | Yamamoto | G06F 40/268 704/9 |
| 6,321,189 | B1 * | 11/2001 | Masuichi | G06F 40/45 704/7 |
| 6,374,210 | B1 * | 4/2002 | Chu | G06F 40/53 704/9 |
| 6,393,388 | B1 * | 5/2002 | Franz | G06F 40/44 704/4 |
| 9,069,767 | B1 * | 6/2015 | Hamaker | G06F 40/45 |
| 10,198,426 | B2 * | 2/2019 | Nakamura | G06F 40/53 |
| 2001/0009009 | A1 * | 7/2001 | Iizuka | G06F 40/284 715/259 |
| 2009/0012776 | A1 * | 1/2009 | Chino | G06F 40/45 704/7 |
| 2010/0223288 | A1 * | 9/2010 | Schneider | G06F 40/30 707/770 |
| 2011/0161144 | A1 * | 6/2011 | Mizuguchi | G06F 40/289 704/9 |
| 2011/0224968 | A1 * | 9/2011 | Sata | G06F 40/55 704/2 |
| 2011/0264439 | A1 * | 10/2011 | Sata | G06F 40/45 704/4 |
| 2012/0016664 | A1 * | 1/2012 | Ando | G06F 40/284 704/9 |
| 2012/0173223 | A1 * | 7/2012 | Liu | G06F 40/45 704/2 |
| 2013/0246045 | A1 * | 9/2013 | Ulanov | G06F 40/289 704/9 |
| 2014/0059033 | A1 * | 2/2014 | Shaw | G06F 40/45 707/708 |
| 2017/0169015 | A1 * | 6/2017 | Huang | G06F 40/58 |
| 2017/0193387 | A1 * | 7/2017 | Lavallee | G06F 40/40 |
| 2017/0287474 | A1 * | 10/2017 | Maergner | G06F 40/45 |
| 2020/0143793 | A1 * | 5/2020 | Saeki | G06F 40/47 |

\* cited by examiner

FIG. 8A

| ID | SCENE | FIXED PHRASE | CANDIDATE FIXED PHRASE FLAG | MAXIMUM VALUE OF SIMILARITY | CHARACTER POSITION ACHIEVING MAXIMUM VALUE | CURRENT VALUE OF SIMILARITY | CURRENT CHARACTER POSITION |
|---|---|---|---|---|---|---|---|
| 1 | BOARDING | THANK YOU FOR BOARDING (IN JAPANESE) ~B1 | 1 | 95 | 16 | 73 | 20 |
| 2 | BOARDING | THIS FLIGHT IS PANASONIC AIRLINES FLIGHT NUMBER 100 (IN JAPANESE) ~B2 | 0 | 12 | 3 | 2 | 20 |
| .. | .. | .. | .. | .. | .. | .. | .. |
| 15 | TAKING OFF | PLEASE FASTEN YOUR SEAT BELT (IN JAPANESE) | 0 | 4 | 2 | 0 | 20 |
| .. | .. | .. | .. | .. | .. | .. | .. |

FIG. 8B

| ID | SCENE | FIXED PHRASE | CANDIDATE FIXED PHRASE FLAG | MAXIMUM VALUE OF SIMILARITY | CHARACTER POSITION ACHIEVING MAXIMUM VALUE | CURRENT VALUE OF SIMILARITY | CURRENT CHARACTER POSITION |
|---|---|---|---|---|---|---|---|
| 1 | BOARDING | THANK YOU FOR BOARDING (IN JAPANESE) ~B1 | 1 | 95 | 16 | 58 | 22 |
| 2 | BOARDING | THIS FLIGHT IS PANASONIC AIRLINES FLIGHT NUMBER 100 (IN JAPANESE) ~B2 | 0 | 12 | 3 | 1 | 22 |
| .. | .. | .. | .. | .. | .. | .. | .. |
| 15 | TAKING OFF | PLEASE FASTEN YOUR SEAT BELT (IN JAPANESE) | 0 | 4 | 2 | 0 | 22 |
| .. | .. | .. | .. | .. | .. | .. | .. |

… # LANGUAGE TRANSLATION BY DIVIDING CHARACTER STRINGS BY FIXED PHASES WITH MAXIMUM SIMILARITY

TECHNICAL FIELD

The present disclosure relates to a translation device and a translation method for automatic translation of data input in a first language into a second language and output of a translation result.

BACKGROUND ART

There has been known a translation method by means of a machine translation system, including dividing an input sentence into short portions and translating each of the divided portions, in view of the fact that a long input sentence tends to cause mistranslation. Sentence division processing includes repeatedly dividing a single sentence and calculating the most appropriate degree of a divided position for each divisional sentence in accordance with a language model. This processing is repeated until the sentence becomes undividable, to obtain candidate divisional sentences (for example, see PTL 1). A divisional sentence having a high similarity is selected from the candidate divisional sentences with reference to a corpus, and is translated.

CITATION LIST

Patent Literature

PTL 1: Unexamined Japanese Patent Publication No. 2006-18354

SUMMARY

Such a conventional method involves calculation of appropriateness degree every time an input sentence is divided, and subsequent translation. This method accordingly includes a large amount of calculation from division processing to output of a translation result, and takes time.

It is an object of the present disclosure to improve translation speed of automatic translation with reference to a fixed phrase.

A translation device according to an aspect of the present disclosure includes a character string output unit, a fixed phrase acquisition unit, a matching unit, a division processor, and a translation result output unit. The character string output unit outputs a plurality of character strings each configuring at least part of text in a first language and including a head character of the text, in order of character string length. The fixed phrase acquisition unit acquires a fixed phrase in the first language associated with a translation phrase in a second language. The matching unit calculates a similarity between each of the character strings and the fixed phrase in order of character string length. The division processor divides the text at a position achieving a maximum similarity among values of the similarity exceeding a first threshold. The translation result output unit outputs the translation phrase as translation of the text thus divided.

A translation method according to another aspect of the present disclosure includes: outputting a plurality of character strings each configuring at least part of text in a first language and including a head character of the text, in order of character string length; acquiring a fixed phrase in the first language associated with a translation phrase in a second language; calculating a similarity between each of the character strings and the fixed phrase in order of the character string length; dividing the text at a position achieving a maximum similarity among values of the similarity exceeding a first threshold; and outputting the translation phrase as translation of the text thus divided.

The present disclosure achieves improvement in translation speed of automatic translation with reference to a fixed phrase.

BRIEF DESCRIPTION OF DRAWINGS

FIG. 8A is a chart indicating exemplary data of progress of the similarity calculation included in the translation processing.

FIG. 8B is a chart indicating different exemplary data of progress of the similarity calculation included in the translation processing.

DESCRIPTION OF EMBODIMENTS

Exemplary embodiments will now be described in detail below with reference to the drawings where appropriate. The following description may not include unnecessarily detailed description. For example, the following description may not include detailed description of a well-known matter and repeated description of substantially identical configurations. This is to prevent unnecessary redundancy in the following description and to facilitate comprehension by those skilled in the art.

The inventor provides the accompanying drawings and the following description to help those skilled in the art to fully comprehend the present disclosure, but does not intend to limit subject matters recited in the claims with the drawings and the description.

First Exemplary Embodiment 1-1. Configuration

Figure 1:
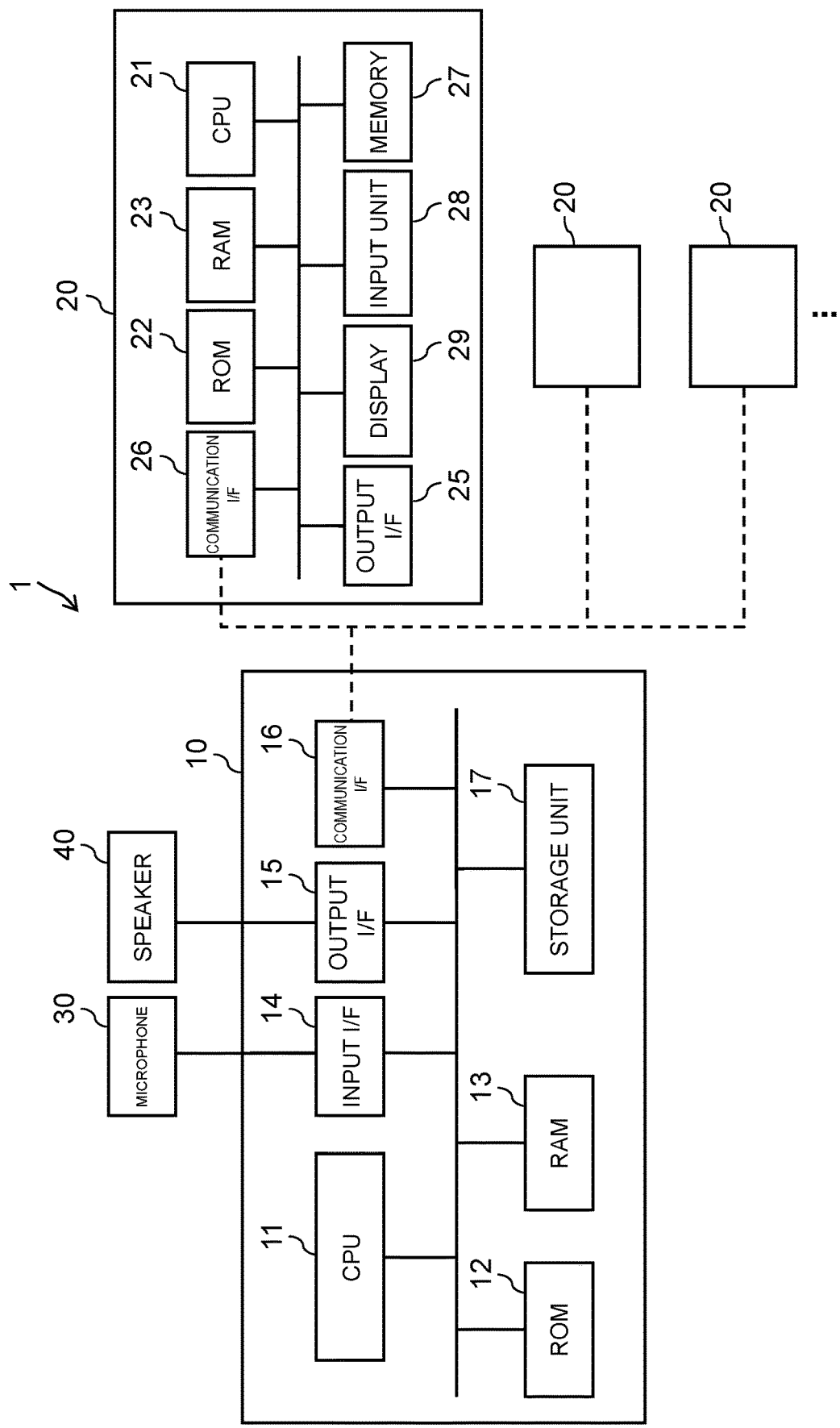
FIG. 1 is a configuration diagram of an entire system according to a first exemplary embodiment.

FIG. 1 depicts a configuration of entire system 1 including server device 10 embodying translation device 110 (see FIG. 2) according to an exemplary embodiment of the present disclosure. System 1 described in the present exemplary embodiment is installed in an aircraft. System 1 includes server device 10, a plurality of display devices 20 connectable wirelessly or wiredly to server device 10, microphone 30, and speaker 40. Display devices 20 are terminal computers disposed at respective seats for passengers of the aircraft.

1-1-1. Configuration of Server Device

Server device 10 is a computer device including central processing unit (CPU) 11, read only memory (ROM) 12, random access memory (RAM) 13, input interface 14, output interface 15, communication interface 16, and storage unit 17 (exemplifying a fixed phrase storage).

CPU 11 is a processor or a circuit configured to execute processing according to a predetermined program. ROM 12 stores a control program describing a processing procedure of CPU 11, and the like. RAM 13 functions as a work memory and temporarily stores a control program and data. Input interface 14 is a connection unit to be connected to microphone 30 and receives A/D converted voice data from microphone 30. Output interface 15 is a connection unit to be connected to speaker 40 and transmits D/A converted voice to speaker 40. Communication interface 16 is a communication circuit configured to communicate wirelessly or wiredly with display devices 20.

Storage unit 17 is a magnetic memory device like a hard disk drive (HDD), or a memory device like a semiconductor memory, and is configured to store programs for an application, an operating system (OS), and the like, as well as various data. Storage unit 17 includes database DB (see FIG. 2) configured to hold various data referred to by CPU 11, as to be described later. Storage unit 17 may be connected to server device 10, as a memory device separate from server device 10.

Microphone 30 is connected to server device 10 and is configured to receive voice of utterance by a cabin crew or the like and output voice data. A cabin is provided with a plurality of speakers 40 configured to output voice received from output interface 15.

1-1-2. Configuration of Translation Device

Figure 2:
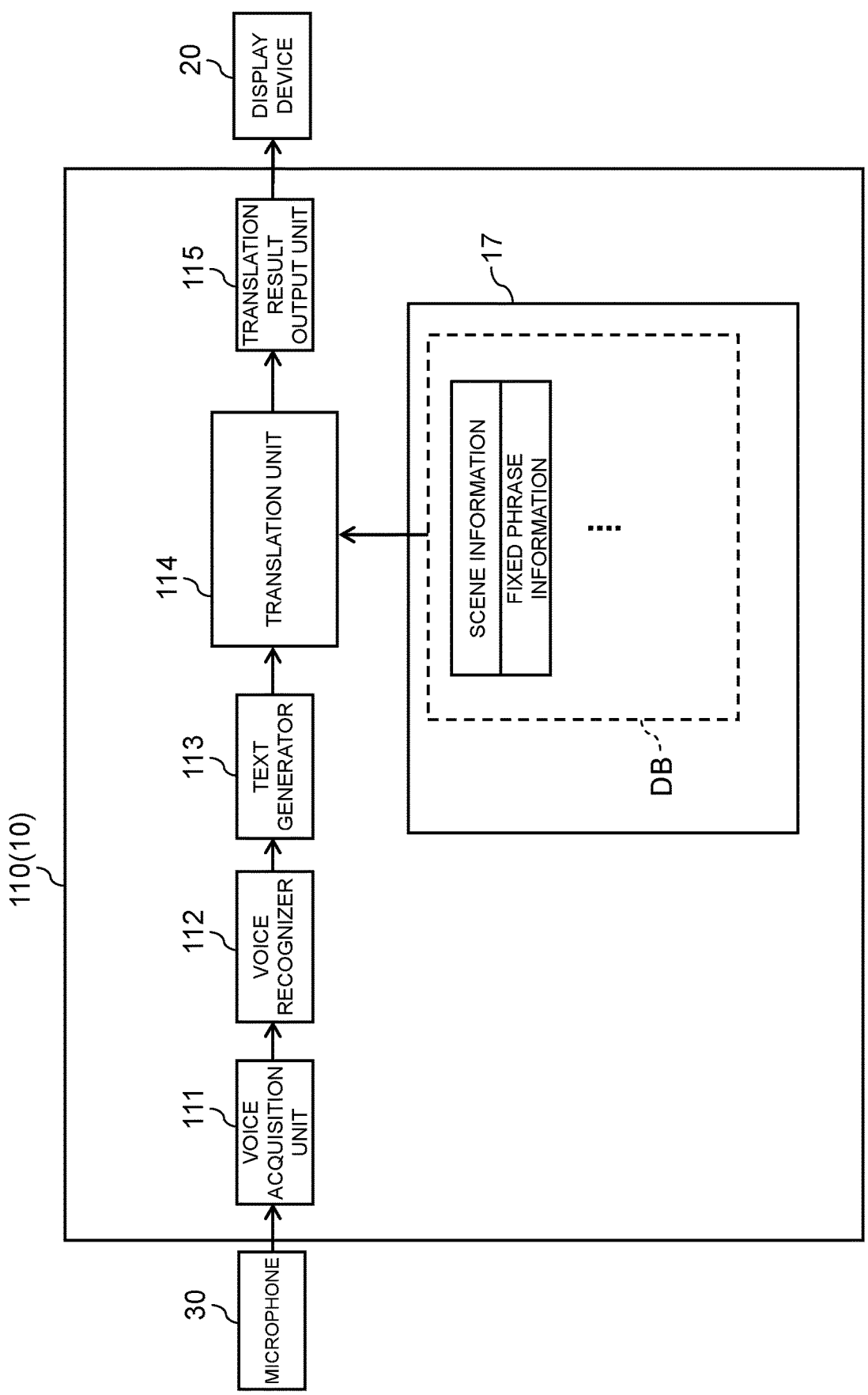
FIG. 2 is a configuration diagram of a translation device according to the first exemplary embodiment.

FIG. 2 depicts a configuration of translation device 110 according to the present exemplary embodiment. Translation device 110 is configured to translate data in Japanese (exemplifying a first language) input by means of voice into text in a language like English (exemplifying a second language).

Translation device 110 includes voice acquisition unit 111, voice recognizer 112, text generator 113, translation unit 114, and translation result output unit 115. Voice acquisition unit 111, voice recognizer 112, text generator 113, translation unit 114, and translation result output unit 115 are each embodied by CPU 11 referring to data in storage unit 17 and executing a predetermined program.

Voice acquisition unit 111 acquires voice data from microphone 30. Voice recognizer 112 recognizes the voice data thus acquired in accordance with a predetermined model stored preliminarily. Text generator 113 converts the voice data thus recognized to text. The text includes character information or a character string that can be converted to voice or can be displayed on a screen.

Translation unit 114 translates the text thus generated.

Figure 3:
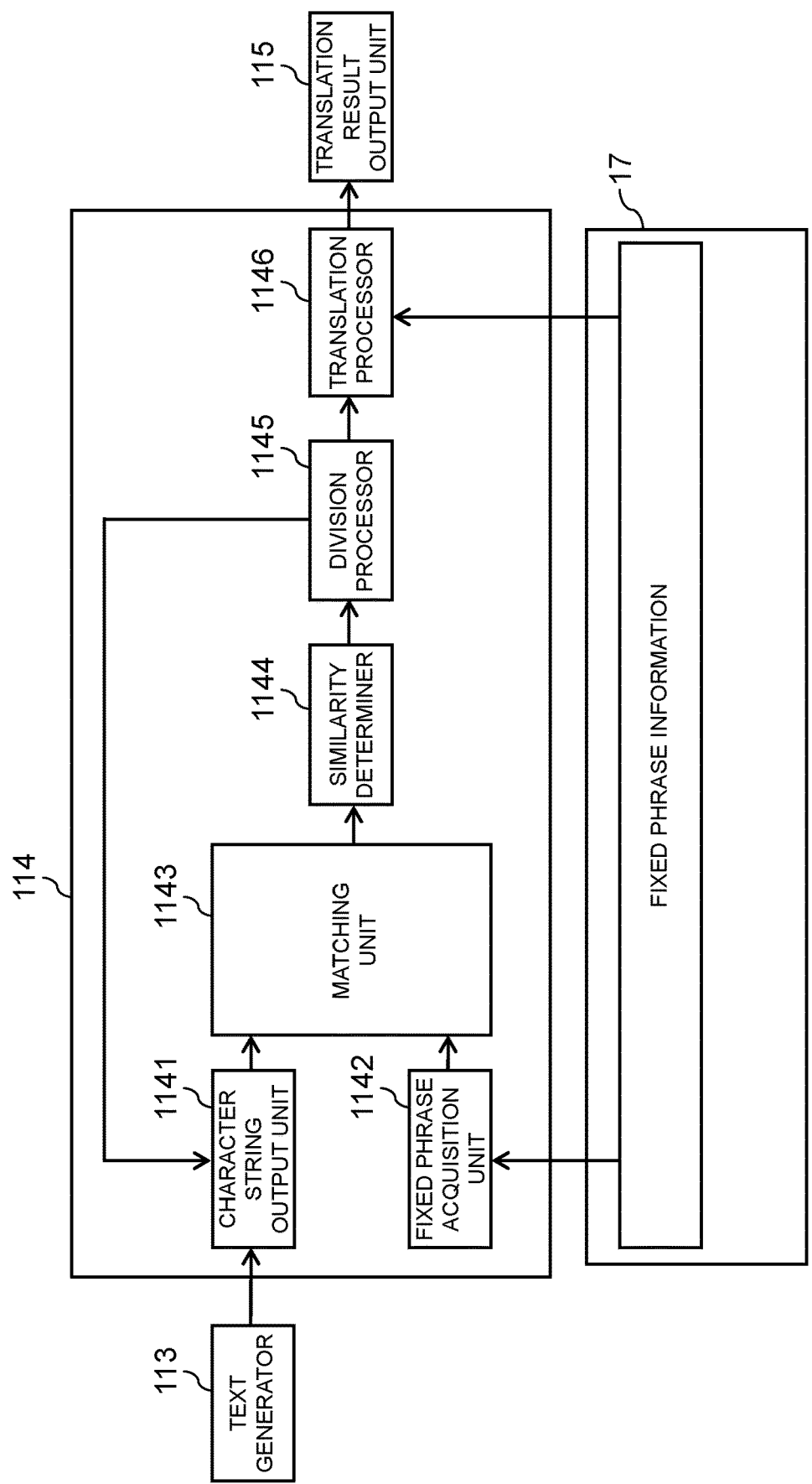
FIG. 3 is a functional configuration diagram of a translation unit included in the translation device.

FIG. 3 depicts principal functional units included in translation unit 114. Translation unit 114 includes character string output unit 1141, fixed phrase acquisition unit 1142, matching unit 1143, similarity determiner 1144, division processor 1145, and translation processor 1146.

Character string output unit 1141 acquires text from text generator 113 and executes character string output processing of outputting character strings that are extracted from the text in the first language while sequentially increasing one character from a head character. Fixed phrase acquisition unit 1142 acquires a plurality of fixed phrases in Japanese stored in storage unit 17. Each of the fixed phrases is associated with a translation phrase in the second language. Matching unit 1143 executes matching processing of comparing each of the acquired character strings including characters sequentially increased one by one with each of the fixed phrases, and calculating a similarity between each of the acquired character strings and each of the fixed phrases. Similarity determiner 1144 executes similarity determination processing of selecting a fixed phrase having a maximum similarity from fixed phrases having calculated similarity values exceeding a first threshold. Division processor 1145 executes division processing of dividing the acquired character string at a position achieving the maximum similarity between the character string and the selected fixed phrase. Translation processor 1146 executes translation processing of acquiring a translation phrase in the second language for the selected fixed phrase.

Translation unit 114 applies as necessary, character string output processing, matching processing, similarity determination processing, division processing, and translation processing to text after the position divided by division processor 1145.

Translation result output unit 115 outputs a result of translation processing executed by translation unit 114. Specifically, translation result output unit 115 outputs the translation phrase as a translation of the text thus divided. The translation result is converted to voice to be outputted via speaker 40. The translation result converted to voice is alternatively transmitted to each display device 20 so as to be output from display device 20 via an earphone or the like. The output translation result may alternatively be presented as character information on display 29 (see FIG. 1) of each display device 20.

Storage unit 17 holds various data stored as database DB.

1-1-3. Contents of Database

Database DB stores scene information and fixed phrase information associated with each other.

Scene Information

The scene information indicates time and an environment of the aircraft, and includes a current scene. The scene information is exemplarily set chronologically in actual aircraft operation such as boarding, taxiing on a runway (before taking off), taking off, flying stably, landing, taxiing on a runway (after landing), or deplaning. The scene information further includes information indicating a scene of utterance at predetermined timing, such as in-flight service guidance or in-flight sales guidance. The scene information still further includes information indicating an unpredictable scene such as emergency contact upon occurrence of significant turbulence of the aircraft, or the like.

Fixed Phrase Information

Figure 6:
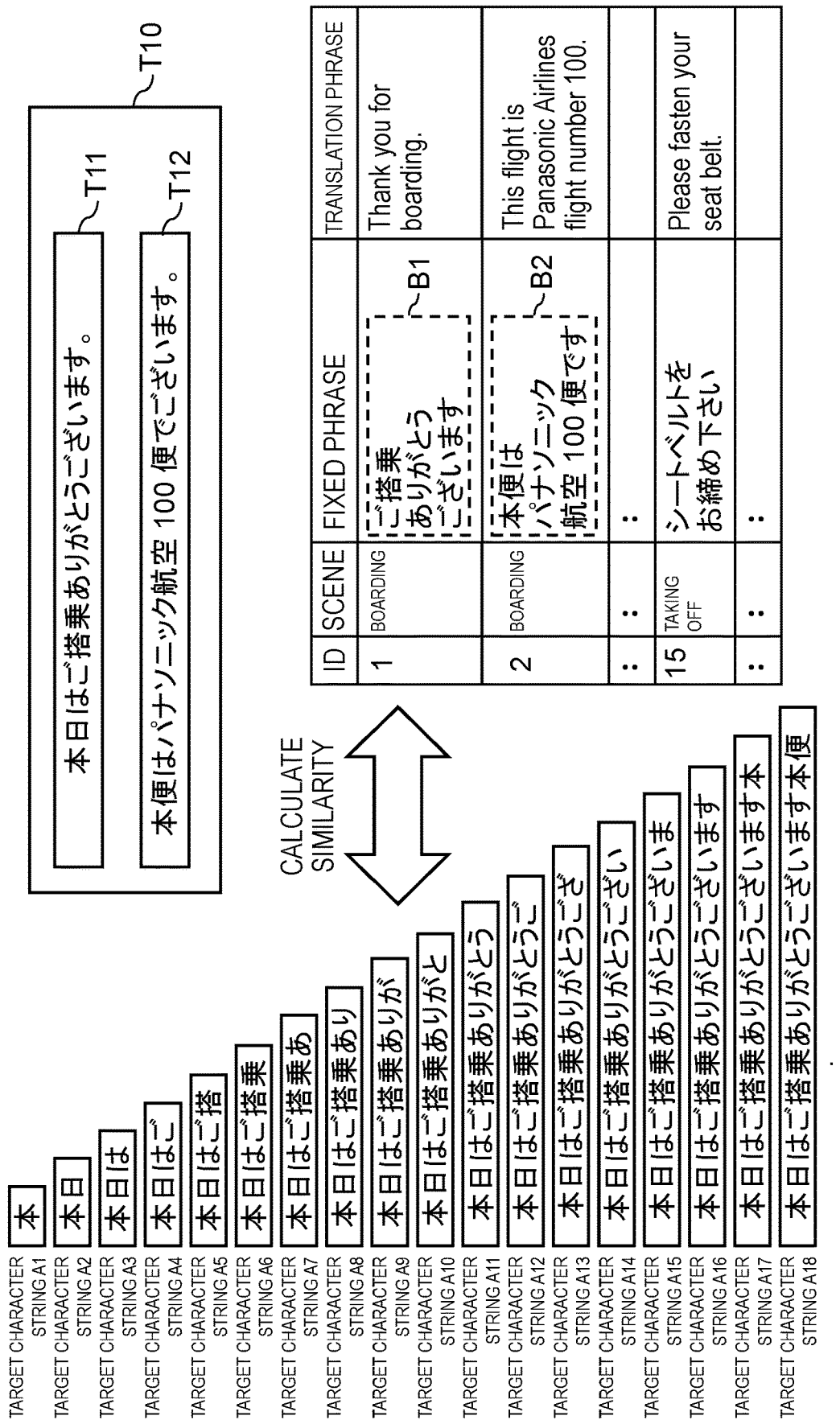
FIG. 6 is an explanatory view of matching processing included in the translation processing.

As indicated in FIG. 6, the fixed phrase information includes fixed phrases in Japanese and translation phrases for the fixed phrases associated with scene information.

1-1-4. Configuration of Display Device

Each display device 20 is a computer device disposed at each seat of the aircraft and including a display configured to present a screen. As depicted in FIG. 1, each display device 20 includes CPU 21, ROM 22, RAM 23, output interface 25, communication interface 26, memory 27, input unit 28, and display 29.

CPU 21 is a processor or a circuit configured to process a command or data and output a result of the processing. ROM 22 stores a control program describing a processing procedure of CPU 21, and the like. RAM 23 functions as a work memory and temporarily stores a control program and data.

Output interface 25 is a connection unit connected to a voice output unit such as an earphone (not depicted), and outputs voice data received from server device 10 or the like.

Communication interface 26 is a communication circuit configured to be communicable wiredly or wirelessly with server device 10 or different equipment provided in the aircraft. Memory 27 is a storage circuit such as a semiconductor memory and stores data like an image.

Input unit 28 accepts input operation by a user at the corresponding seat via a touch panel, a keyboard, or a pointing device (e.g. mouse). Display 29 is configured by a liquid crystal panel, an organic electroluminescence (EL) panel, or a panel similar to any one of these panels, and includes a screen presenting a processed image. Display 29 alternatively presents text of a translation result generated by translation device 110.

1-2. Behavior

Server device 10 (translation device 110) according to the present disclosure will be described below in terms of behavior.

1-2-1. Entire Behavior of Translation Device

Figure 4:
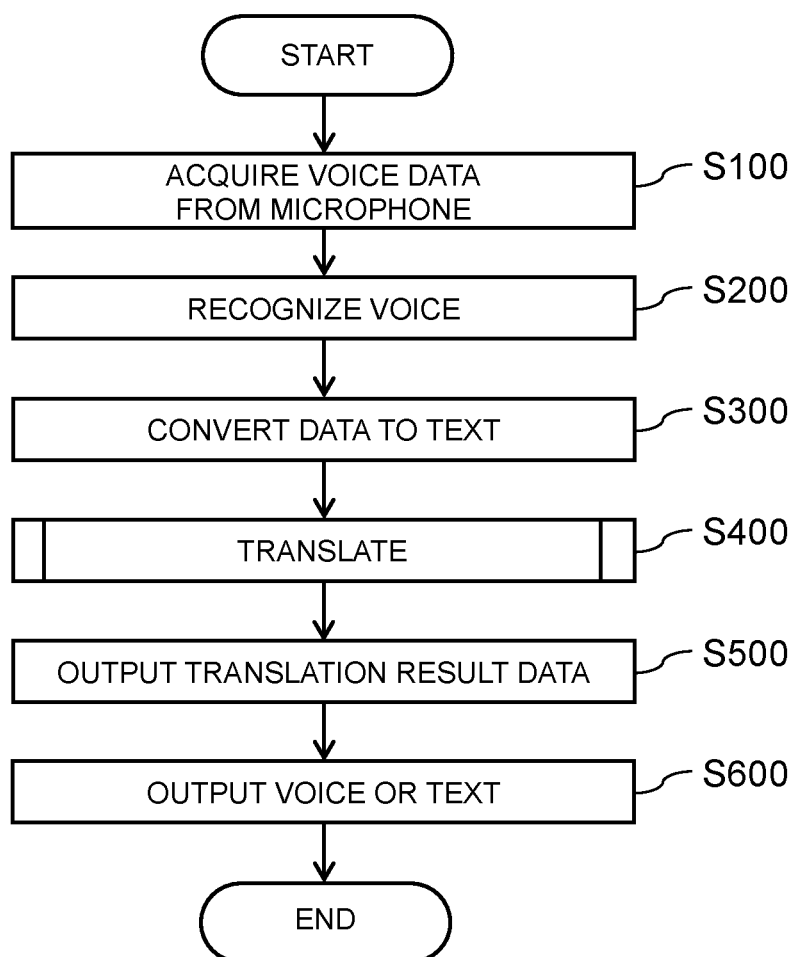
FIG. 4 is a flowchart of behavior of the translation device.

FIG. 4 depicts an entire control flow executed by translation device 110. Described below is processing of translating contents of announced utterance in the first language by a cabin crew in the aircraft into the second language.

S100: Voice acquisition unit 111 in translation device 110 acquires voice data from microphone 30.

S200: Voice recognizer 112 applies voice recognition processing to the voice data thus acquired.

S300: Text generator 113 converts voice recognized data to text.

S400: Translation unit 114 applies translation processing to the text obtained by conversion, as to be described later.

S500: Translation result output unit 115 outputs data of a translation result obtained by the translation processing.

S600: The data of the translation result is converted to voice data, to be output by means of voice via speaker 40 or to be transmitted to display device 20 at each seat and output by means of voice via the earphone. The data of the translation result may alternatively be presented by means of text on display 29 of each display device 20.

1-2-2. Translation Processing

Figure 5A:
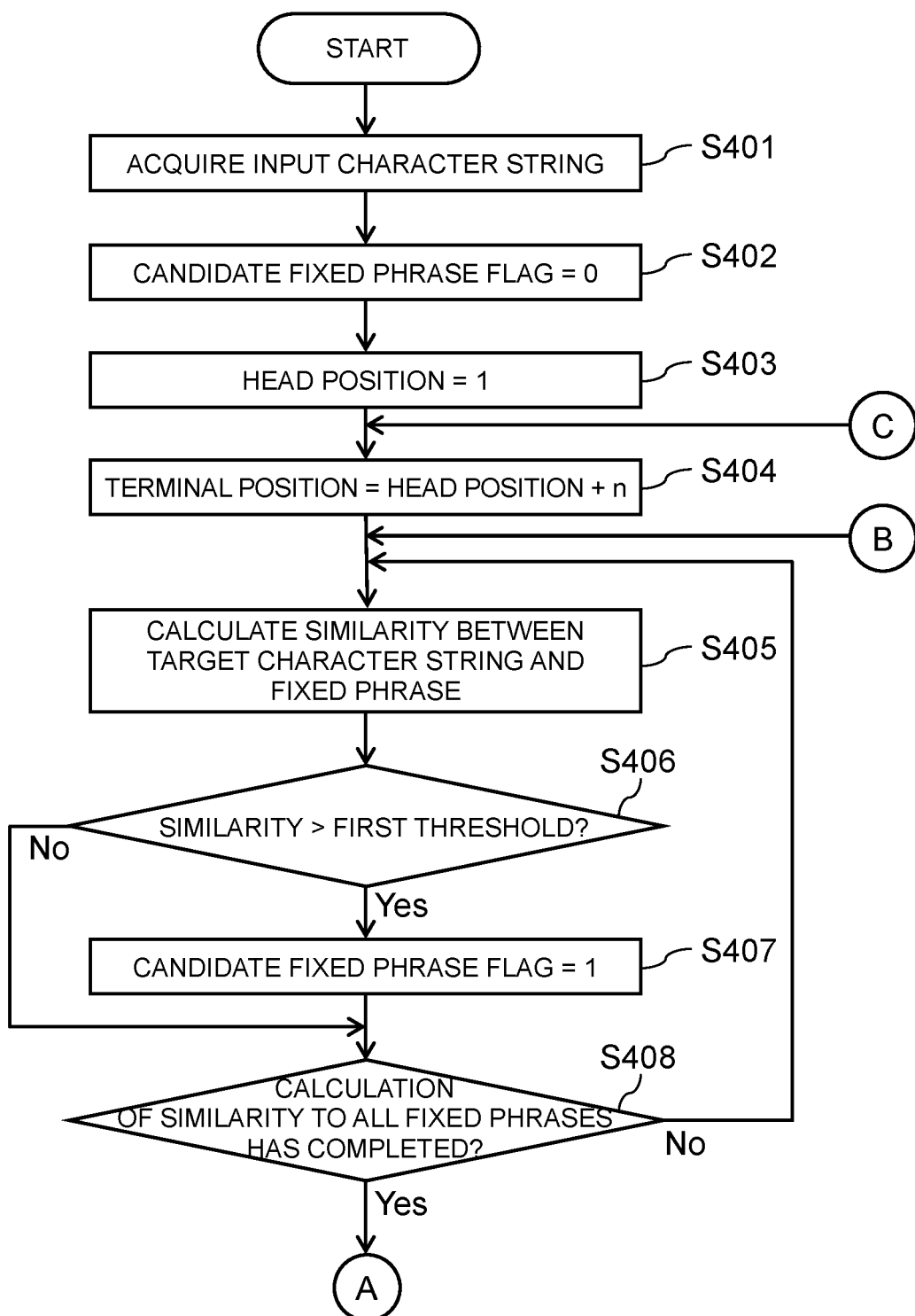
FIG. 5A is a flowchart of translation processing executed by the translation device.
Figure 5B:
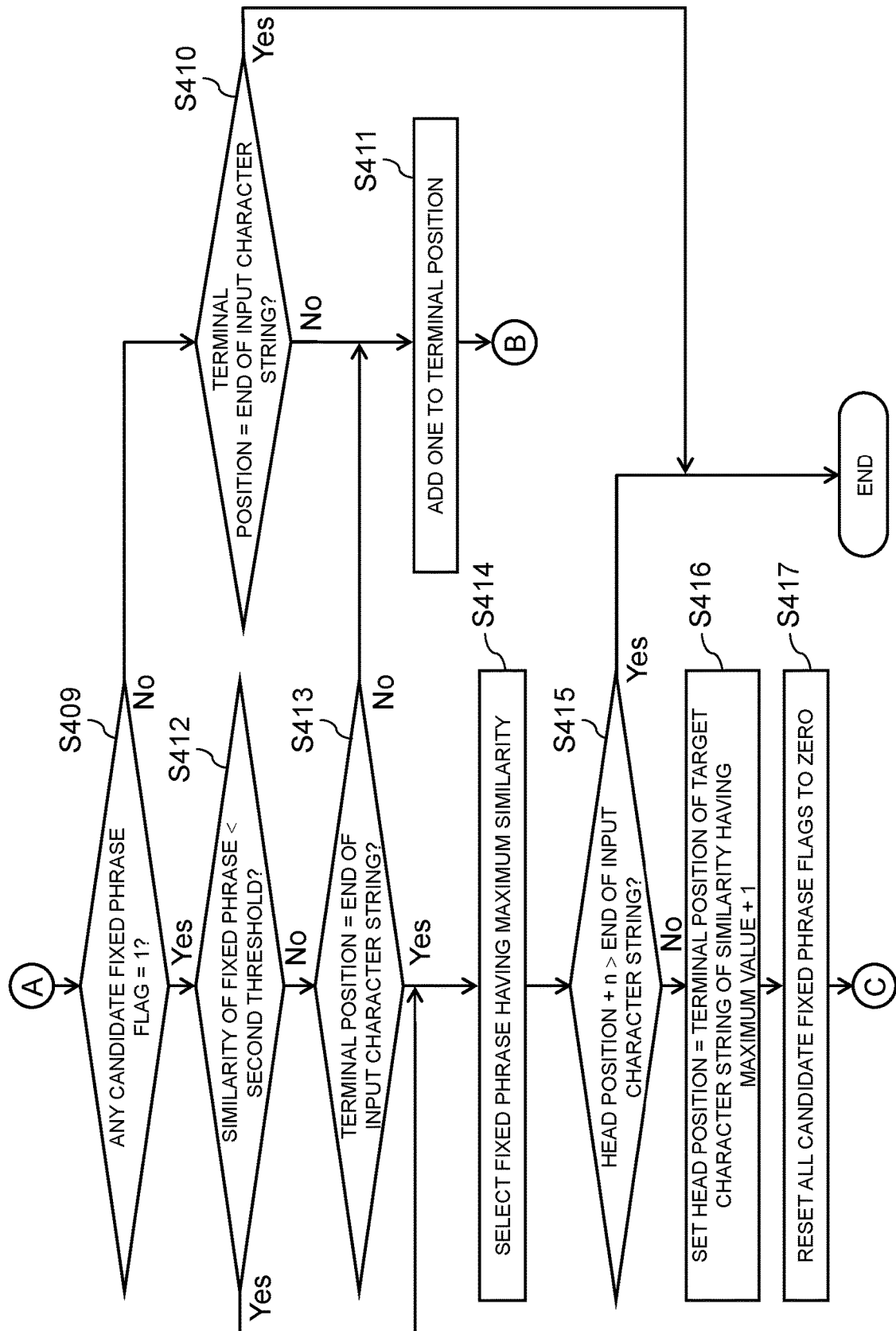
FIG. 5B is a flowchart of subsequent translation processing executed by the translation device.

FIG. 5A and FIG. 5B depict a flow of translation processing executed by translation unit 114 (see FIG. 2 and FIG. 3) in step S400 in FIG. 4.

S401: Translation unit 114 acquires an input character string converted to text. Described in this case as an exemplary sentence is text T10 including text T11 meaning "Thank you for boarding today." and text T12 meaning "This flight is Panasonic Airlines flight number 100.", as depicted in FIG. 6.

FIG. 6 particularly depicts an overview of matching processing between character strings and fixed phrases in translation processing executed by translation unit 114 (see FIG. 3) according to the present exemplary embodiment. The present exemplary embodiment includes extracting character strings as calculation targets (hereinafter, called target character strings) from a character string being input (obtained by converting contents of utterance to text, hereinafter called an input character string), and calculating the similarity. As depicted in FIG. 6, the target character strings being output include characters sequentially increased one by one, and each of the output target character strings is compared with all the fixed phrases.

S402: Translation unit 114 sets an initial value of a candidate fixed phrase flag to "zero". The candidate fixed phrase flag is provided for each of the fixed phrases and is set to "one" for a fixed phrase having values of similarity exceeding a predetermined threshold (first threshold), as to be described later.

S403: Translation unit 114 sets a head position of each target character string to "one". In this case, translation unit 114 sets the head position of each target character string as a similarity calculation target included in the input character string.

S404: Translation unit 114 sets a terminal position to "a value of the head position+n". In this case, translation unit 114 sets the terminal position of each target character string included in the input character string.

The value "n" is a constant for setting of the terminal position of a target character string. The value n is an integer more than or equal to zero, and corresponds to a minimum number of characters necessary for matching processing with a fixed phrase. First one or two characters are often insufficient for measurement of the similarity to a fixed phrase. Preliminarily setting the number of characters of a calculation target character string to a plurality of numbers at the start of calculation will achieve suppression of an initial amount of calculation in comparison to a case of starting the number of characters from one. As depicted in FIG. 6, assume an exemplary case where the input character string starts with text T11 and the value "n" is set to "two". In this case, the initial terminal position is set to a terminal position of target character string A3 obtained as the value of the head position+2.

S405: Translation unit 114 calculates the similarity between each target character string obtained by extracting a character string between the head position and the terminal position thus set and each of the fixed phrases (matching processing).

As depicted in FIG. 6, assume an exemplary case where the input character string is text T10 and the character string set in step S404 is target character string A3. In this case, target character strings A3, A4, A5, . . . are sequentially determined as to whether or not to be similar to each of the fixed phrases. The similarity can be calculated in accordance with a publicly known technique (e.g. the vector space model).

S406: Translation unit 114 determines whether or not the similarity between the target character string and each of the fixed phrases exceeds the first threshold. The process flow proceeds to step S407 if the similarity exceeds the first threshold, whereas the process flow proceeds to step S408 if the similarity is less than or equal to the first threshold.

The first threshold serves as a criterion of whether or not the fixed phrase highly possibly matches a target character string.

Figure 7A:
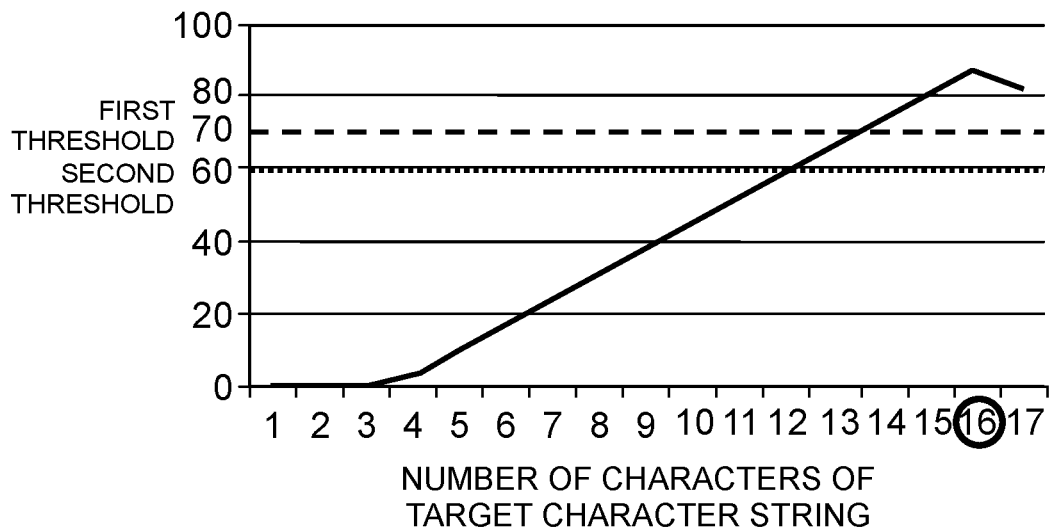
FIG. 7A is a graph indicating a result of similarity calculation included in the translation processing.
Figure 7B:
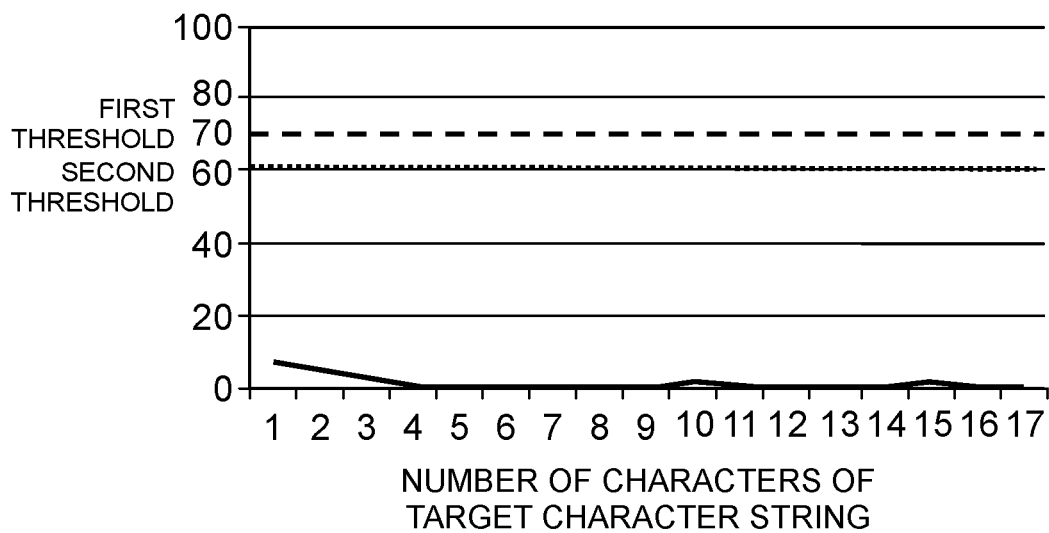
FIG. 7B is a graph indicating another result of the similarity calculation included in the translation processing.

In an exemplary case where the input character string starts with text T11, matching processing with fixed phrase B1 (see FIG. 6) has a result indicated in FIG. 7A. This exemplary case has a high similarity exceeding the first threshold (70 in this case). As indicated in FIG. 7B, the similarity to fixed phrase B2 is kept low without exceeding the first threshold. The first threshold has a value that is not limited to this exemplary case and may alternatively be more or less than 70.

S407: When the similarity is determined as exceeding the first threshold, translation unit 114 sets, to "one", the candidate fixed phrase flag for the fixed phrase having values of the similarity determined as exceeding the first threshold. Any fixed phrase having the candidate fixed phrase flag already set to "one" in step S406 may skip comparison between the similarity and the first threshold.

S408: Translation unit 114 determines whether or not calculation of the similarity between the target character string and all the fixed phrases has already completed. The process flow returns to step S405 if the calculation has not yet completed, for repeated processing until calculation of the similarity to all the fixed phrases completes. The process flow proceeds to step S409 in FIG. 5B if the calculation of the similarity between the target character string and all the fixed phrases has already completed.

S409: Translation unit 114 determines whether or not all the fixed phrases having calculated the similarity to the target character string include any fixed phrase having the candidate fixed phrase flag set to "one". The process flow proceeds to step S410 if there is no fixed phrase having the candidate fixed phrase flag set to "one". The process flow proceeds to step S412 if there is any fixed phrase having the candidate fixed phrase flag set to "one".

S410: Translation unit 114 determines whether or not the "terminal position" of the target character string is located at the end of the input character string. The process flow proceeds to step S411 if the terminal position is not located at the end of the input character string. The process flow ends if the terminal position is located at the end of the input character string. If the similarity to each of the fixed phrases does not exceed the first threshold, there will be no fixed phrase entirely or partially matching the input character string. In this case, translation unit 114 may be configured to translate the input character string by means of ordinary machine translation, or may be configured to translate with reference to the fixed phrase having the maximum similarity at this stage.

S411: Translation unit 114 adds one to the value of the "terminal position" of the target character string. The process flow then returns to step S405 in FIG. 5A for calculation of the similarity between the target character string having such a changed terminal position and each of the fixed phrases. The value added to the terminal position is not limited to one but may alternatively be a predetermined number more than or equal to two. This causes accuracy of sentence division to change by the unit of the predetermined number, but reduces the number of times of the similarity calculation.

S412: if there is determined as being any fixed phrase having the candidate fixed phrase flag set to "one" in step S409, translation unit 114 determines whether or not the similarity of each of such fixed phrases is less than a second threshold. The process flow proceeds to step S414 if the similarity is determined as being less than the second threshold, and proceeds to step S413 if the similarity is determined as being not less than the second threshold.

The second threshold is less than the first threshold by at least a predetermined value. If the similarity before reaching the first threshold achieves high possibility of match with a fixed phrase and then decreases due to continuous mismatch with subsequent characters to become less than the second threshold, a character string having the maximum similarity is assumed as matching the fixed phrase.

For example, target character string A18 in FIG. 6 has a similarity to fixed phrase B1 gradually decreasing from a seventeenth character, as indicated in FIG. 7A. Such a decreasing tendency is determined to specify a division point of the input character string as to be described later. The second threshold (60 in this case) serves as a criterion value for the decrease tendency.

The second threshold has a value that is not limited to this exemplary case and may alternatively be more or less than 60.

If there is any fixed phrase higher in the similarity than the fixed phrase having the similarity determined as being less than the second threshold in this step, the process flow may alternatively proceed to step S413 instead of step S414. Assume an exemplary case where there are two fixed phrases, namely, a first fixed phrase meaning "Please stow your baggage in the compartment above the seats." and a second fixed phrase meaning "Please stow your baggage in the compartment above your feet. Passengers in the economy class can stow your baggage also under the seat in front of you.", and utterance includes a sentence identical to the second fixed phrase.

The similarity of the first fixed phrase becomes maximum when a character string until the end of the first fixed phrase is processed, and then gradually decreases to become less than the second threshold at a certain stage. In contrast, the similarity of the second fixed phrase is more than or equal to the second threshold when the similarity of the first fixed phrase becomes less than the second threshold, and keeps increasing. The second fixed phrase has an eventual maximum value of the similarity more than a maximum value of the similarity of the first fixed phrase.

In this manner, the second fixed phrase, which is preferably selected, may not be selected because the first fixed phrase satisfies conditions earlier. In order to prevent this for highly accurate translation, even when the similarity is detected as being less than the second threshold in step S412, there is provided an additional second condition "the process flow proceeds not to step S414 but to step S413 for continuous calculation and comparison of the similarity if there is any candidate higher in the current similarity (for the character string length) than a target candidate fixed phrase".

S413: Translation unit 114 determines whether or not the "terminal position" of the target character string is located at the end of the input character string. The process flow proceeds to step S414 if the "terminal position" is located at the end of the input character string, whereas the process flow proceeds to step S411 if the "terminal position" is not located at the end of the input character string.

S414: Translation unit 114 selects a fixed phrase having the maximum similarity from the fixed phrases each having the candidate fixed phrase flag set to "one" (similarity determination processing). Translation unit 114 then acquires translation of this fixed phrase to execute translation processing.

S415: Translation unit 114 compares an end position of the input character string with the head position+n. The process flow ends if the end position of the input character string is less than, in other words, ahead of, the head position+n. The process flow proceeds to step S416 if the end position of the input character string is more than or equal to, in other words, identical to or behind, the head position+n.

S416: Translation unit 114 sets, as the terminal position, a character position of the target character string achieving the maximum similarity, and sets a subsequent head position to a value obtained by the terminal position+1 (division processing).

Assume an exemplary case where fixed phrase B1 is selected for text T10 (step S414). As indicated in FIG. 7A, the similarity becomes maximum at the sixteenth character. A character position obtained by adding one to this character position (terminal position) is thus set as a new "head position". The head position of subsequent text T12 is accordingly set as the new head position.

S417: Translation unit 114 resets all the candidate fixed phrase flags to zero. The process flow then returns to step S404. Translation unit 114 then applies similar processing to a divided character string.

FIG. 8A and FIG. 8B are charts indicating calculation result data of the similarity of each of the fixed phrases to text T10. Each chart has a column "maximum value of similarity" indicating a maximum value of the similarity to each of the fixed phrases. The chart further has a column "character position achieving maximum value" indicating the terminal position of the character string of the similarity having the maximum value corresponds to what order number of character from the first character of the input character string. The chart also has a column "current value of similarity" indicating a latest value of the similarity. The chart still further has a column "current character position" indicating the latest value corresponds to what order number of character from the first character of the input characters.

According to the data indicated in FIG. 8A, the similarity calculation has finished for first to twentieth characters, but processing will continue because the current value (73 in this case) of the similarity of fixed phrase B1 has not become less than the second threshold (60 in this case) (S412 (No)→S413 (No)→S411→S405 to S412). The current value of the similarity is updated each time the similarity is calculated for an increased target character string. The maximum value of the similarity is updated when the current value of the similarity exceeds the recorded maximum value of the similarity. If the current value exceeds the first threshold (70 in this case), the fixed phrase flag is changed to one (S407).

According to the data indicated in FIG. 8B, the similarity calculation has finished for first to twenty second characters, where the current value of the similarity of each of the fixed phrases becomes less than the second threshold 60, so that the similarity calculation ends. That is, matching unit 1143 ends the similarity calculation when the similarity becomes less than the second threshold. Fixed phrase B1 of the similarity having the maximum value is selected to acquire translation "Thank you for boarding." as a translation (S412 (Yes) to S414). If two or more candidate fixed phrase flags are set to "one", a fixed phrase of the maximum similarity having a largest value is selected.

Other Exemplary Processing

Translation unit 114 is also configured to execute the following processing.

Figure 9:
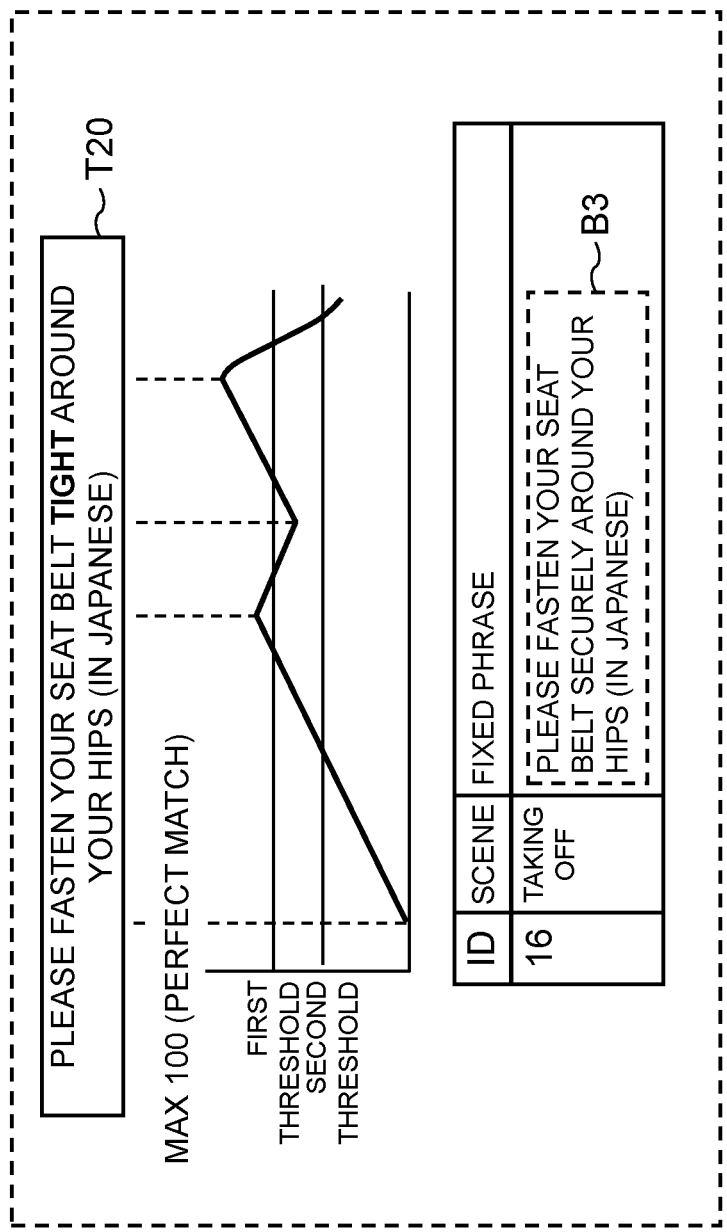
FIG. 9 is a graph indicating a result of different similarity calculation included in the translation processing.

When the input character string includes a phrase portion included in none of the fixed phrases, such a phrase portion has a low value of the similarity. Assume an exemplary case where a character string meaning "Please fasten your seat belt securely around your hips." is selected as fixed phrase B3 having the maximum similarity for input character string T20 meaning "Please fasten your seat belt tight around your hips." as in FIG. 9. In this case, the portion meaning "tight" in the input character string does not match the portion meaning "securely" in the fixed phrase. As in exemplarily indicated in a graph in FIG. 9, the similarity accordingly varies by once exceeding the first threshold, becoming less than the first threshold, and exceeding the first threshold again.

Translation unit 114, however, continues calculation of the similarity even when the similarity decreases halfway because the similarity does not become less than the second threshold. The similarity thus increases again to update the maximum value.

In such a case where the input character string includes a halfway phrase portion not included in the fixed phrases, the similarity once exceeds the first threshold, then becomes less than the first threshold, and increases again to exceed the first threshold, to have two or more maximum points exceeding the first threshold. Translation unit 114 calculates the similarity to achieve matching with a most similar fixed phrase if there is included difference (noise) of such a phrase portion that is not long. If the phrase portion is long, the input character string is divided when the similarity becomes less than the second threshold, for achievement of appropriate division processing. Translation processing executed by translation unit 114 thus achieves translation with reference to a fixed phrase even when a character string includes a plurality of sentences or words partially different from the fixed phrase.

1-3. Features and Others

In translation unit 114 of translation device 110 according to the exemplary embodiment described above, character string output unit 1141 outputs a plurality of character strings (a plurality of target character strings) each configuring at least part of text in the first language and including a head character of the text, in order of character string length. Matching unit 1143 calculates a similarity between each of the character strings and a fixed phrase in order of character string length. Similarity determiner 1144 selects a fixed phrase having a maximum similarity from fixed phrases having calculated similarity values exceeding the first threshold. Division processor 1145 divides the text at a position achieving the maximum similarity among values of the similarity exceeding the first threshold. This configuration thus achieves significant reduction in amount of calculation for matching processing with the fixed phrases and division processing. Even in a case where input text includes a plurality of sentences, the text is divided at an appropriate point for continuous matching processing with the fixed phrases, achieving higher speed of translation processing. This configuration further enables matching and similarity determination for each fixed phrase, without need for preliminary storage of a plurality of combinations of fixed phrases. This achieves reduction in size of the storage such as database.

Other Exemplary Embodiments

The first exemplary embodiment has been described above to exemplify the techniques disclosed in the present application. The techniques according to the present disclosure are not limited by the exemplary embodiment, and are applicable to other exemplary embodiments achieved through change, replacement, addition, elimination, or the like where appropriate. Furthermore, constituent elements and functions according to the first exemplary embodiment can be combined to obtain new exemplary embodiments.

Such other exemplary embodiments will be described below.

[1]

The above exemplary embodiment provides translation through acquisition of translation of the fixed phrase most similar to the input character string. The input character string is thus translated in accordance with the fixed phrase even if there is included a phrase portion different from the fixed phrase. Translation unit 114 may alternatively be configured to freely translate such a phrase portion different from the fixed phrase.

Figure 10:
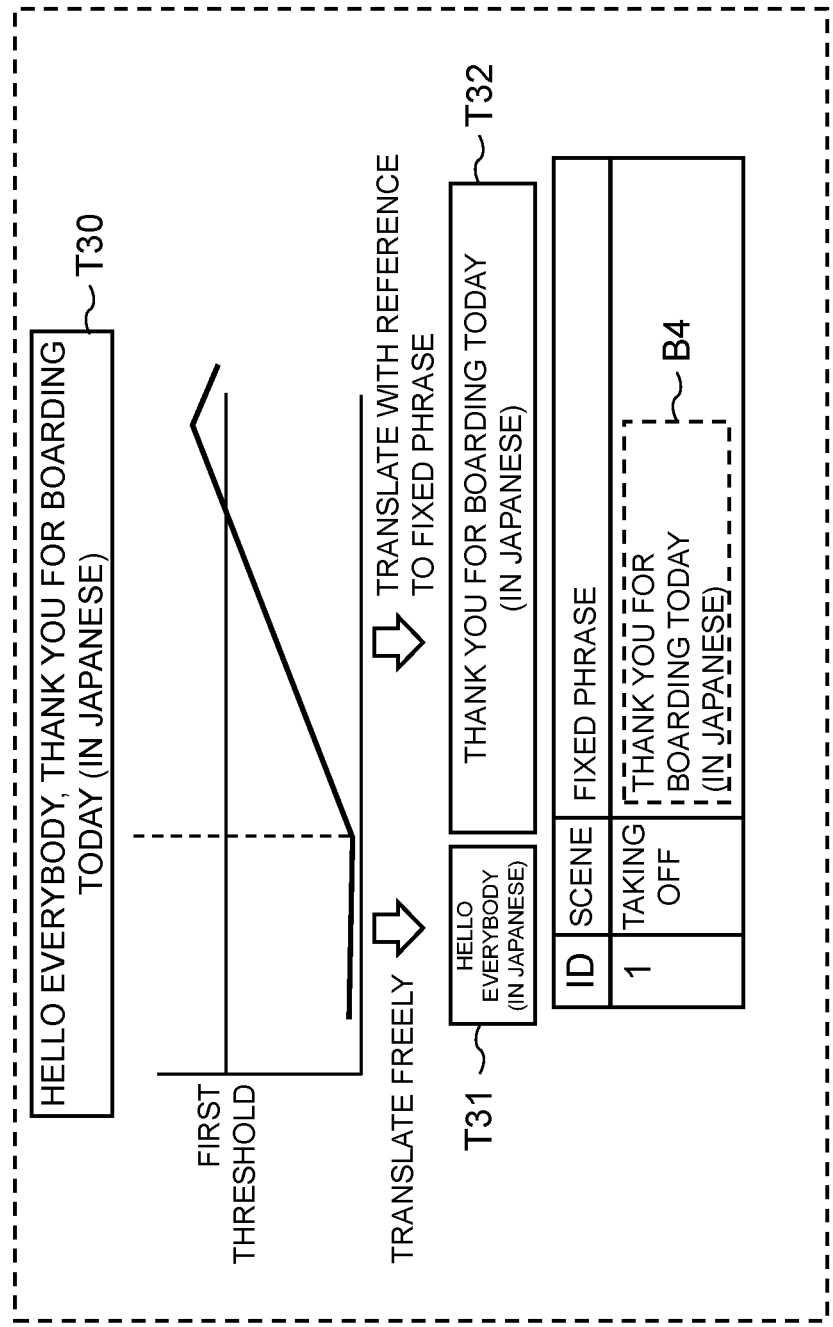
FIG. 10 is an explanatory view of translation processing according to a different exemplary embodiment.

Assume an exemplary case of input character string T30 meaning "Hello everybody, thank you for boarding today." as in FIG. 10. Initial character string T31 meaning "Hello everybody" does not have any relevant fixed phrase in this case and fails to acquire translation through calculation of the similarity. In view of this, translation unit 114 executes the predetermined translation processing described above (FIG. 5A and FIG. 5B), to divide input character string T30 into character string T31 and character string T32. These divided sentences are then compared with fixed phrase B4, for determination of a different portion (i.e. character string T31). Translation unit 114 may alternatively be configured to apply ordinary machine translation to the different portion and output a translation result along with translation with reference to the fixed phrases. In other words, translation processor 1146 may alternatively be configured to translate into the second language without reference to the fixed phrases, the portion (character string T31) irrelevant to the fixed phrases, in the divided text.

[2]

According to the above exemplary embodiment, the similarity is unlikely to increase by being affected largely by extremely long utterance that is irrelevant to the fixed phrases. In order to prevent this, the first threshold may be decreased substantially or a section having values of the similarity substantially equal to zero may be deleted, for higher accuracy in matching with the fixed phrases.

[3]

Translation unit 114 according to the above exemplary embodiment executes processing of matching between each acquired character string and each fixed phrase. The present disclosure is not necessarily limited to this configuration. When there is at least predetermined difference between the similarity values calculated for a plurality of fixed phrases, matching processing may be executed while excluding any fixed phrase of the similarity having a value less than a predetermined value. Specifically, when the similarity of a first fixed phrase and the similarity of a second fixed phrase have difference exceeding a predetermined value, matching unit 1143 may alternatively be configured to end calculation of the similarity of the remaining fixed phrases. This configuration achieves reduction in amount of calculation for matching processing.

Still alternatively, when there are at least a predetermined number of fixed phrases having the similarity exceeding the first threshold, matching processing may not be applied to the remaining fixed phrases. Further alternatively, when a predetermined fixed phrase has the similarity achieving 100 or a value close to 100, matching processing may be ended and translation processing may be executed with reference to this fixed phrase.

[4]

Each of the fixed phrases according to the above exemplary embodiment may alternatively have weighing information added to the similarity in accordance with the number of characters. Specifically, matching unit 1143 may be configured to add a weight to the similarity in accordance with length of each of the fixed phrases. In this case, a value of the weight is determined such that fixed phrases having smaller numbers of characters have a higher similarity. Such similarity additionally having a tendency according to the length of the character string of each of the fixed phrases is likely to increase even for a fixed phrase having a small number of characters. This leads to increase in speed of similarity determination processing.

[5]

The above exemplary embodiment includes matching processing with all the fixed phrases. The present disclosure is not necessarily limited to this configuration. As described above, the fixed phrases are categorized into groups of different scene information. Scene determination may thus be executed for processing of matching, similarity determination, division, and translation with prioritized reference to fixed phrases relevant to the scene information thus determined. Specifically, fixed phrase acquisition unit 1142 may be alternatively configured to acquire a fixed phrase adapted to a current scene among a plurality of fixed phrases. In this case, translation unit 114 specifies the current scene and applies the translation processing depicted in FIG. 5A and FIG. 5B to the fixed phrase adapted to the specified scene.

The current scene may be specified through input operation by a cabin crew or through scene determination executed by server device 10. Server device 10 may be configured to determine the current scene in accordance with information transmitted from an operation system or the like (e.g. altitude information, speed information, door open/close information, or time information).

[6]

Translation unit 114 according to the above exemplary embodiment is configured to output the target character strings including characters (including Chinese characters) sequentially increased one by one from the head of the input character string of text, and match with the fixed phrases. The present disclosure is not necessarily limited to this configuration. Matching can alternatively be applied to a predetermined unit appropriate for a target language or an adopted voice recognition method, such as characters forming a phoneme, each word, or each alphabetical character.

The target character strings output for matching processing are not limitedly sequentially increased by a predetermined unit from the head of the input character string, but may alternatively be extracted by units varied in number of characters or the like.

[7]

The above exemplary embodiment provides the second threshold for determination of a decreasing tendency of the similarity and specification of a character position (achieving the similarity having the maximum value) as a division point for division processing. The present disclosure is not necessarily limited to this configuration. The second threshold may not be provided and division processing may alternatively be executed when a decreasing tendency continues for a predetermined period (e.g. the number of characters).

[8]

Translation device 110 is not limitedly utilized in an aircraft. Translation device 110 can alternatively be installed and applied where translation with reference to fixed phrases is available, such as guidance at an airport, different public transport, a restaurant, a hospital, or an accommodation.

Translation device 110 may still alternatively be provided to a computer terminal. In this case, translation processing may be applied to data input by means of voice or text (after voice is subjected to voice recognition processing), and a translation result may be output via a speaker or a display.

[9]

The translation processing (FIG. 5A and FIG. 5B) according to the above exemplary embodiment is not limited to the above exemplary embodiment in terms of the order of execution. Alternatively, the processing may partially be executed parallelly or may be executed in a different order without departing from the scope of the present disclosure.

[10]

The above exemplary embodiment includes inputting voice data according to utterance. The present disclosure is not necessarily limited to this configuration. Alternatively, text may be acquired via the input interface from an input unit such as a touch panel or a keyboard, or may be acquired via the communication interface from an external device, and translation unit 114 may apply translation processing to the text.

[11]

Translation device 110 or translation unit 114 according to the present disclosure is not limitedly embodied in accordance with any one of the above exemplary embodiments. A translation method and a computer program executed by translation device 110 or translation unit 114, and a computer-readable recording medium including the program are included in the scope of the present disclosure. Examples of the computer-readable recording medium include a flexible disk, a hard disk, a compact disc read-only memory (CD-ROM), a magneto-optical disk (MO), a digital versatile disc (DVD), a DVD-ROM, a DVD-RAM, a Blu-ray (registered trademark) disc (BD), and a semiconductor memory.

The computer program is not limitedly recorded on the recording medium and may alternatively be transmitted via a network or the like represented by an electric communication line, a wireless or wired communication line, or the Internet.

INDUSTRIAL APPLICABILITY

The present disclosure is applicable to a translation device or a translation method.

REFERENCE MARKS IN THE DRAWINGS

1: system
10: server device
11: CPU
12: ROM
13: RAM
14: input interface
15: output interface
16: communication interface
17: storage unit
20: display device
21: CPU
22: ROM
23: RAM
25: output interface
26: communication interface
27: memory
28: input unit
29: display
30: microphone
40: speaker
110: translation device
111: voice acquisition unit
112: voice recognizer
113: text generator
114: translation unit
115: translation result output unit
1141: character string output unit
1142: fixed phrase acquisition unit
1143: matching unit
1144: similarity determiner
1145: division processor
1146: translation processor

The invention claimed is:

1. A translation device comprising:
a character string output unit configured to:
acquire text in a first language, the text including a first letter as a head character,
generate a plurality of character strings from the acquired text, each of the plurality of character strings configuring at least part of the acquired text, a head character of each of the plurality of character strings being same as the head character of the acquired text, and
output the plurality of character strings in order of character string length;
a fixed phrase acquisition unit configured to acquire a fixed phrase in the first language associated with a translation phrase in a second language;
a matching unit configured to calculate a similarity between each of the character strings and the fixed phrase in order of the character string length;
a division processor configured to divide the text at a position achieving a maximum similarity among values of the similarity exceeding a first threshold; and
a translation result output unit configured to output the translation phrase as translation of the text thus divided, wherein:
the plurality of character strings at least include:
a first character string that includes only the first letter of the acquired text;
a second character string that includes only the first character string and a second letter of the acquired text;
a third character string that includes only the second character string and a third letter of the acquired text; and
a fourth character string that includes only the third character string and a fourth letter of the acquired text, and
the matching unit is configured to calculate similarities between the first to the fourth character strings and the fixed phrase in order of the first to the fourth character strings.

2. The translation device according to claim 1, wherein the division processor divides the text at the position achieving a maximum similarity among values of the similarity after the similarity exceeds the first threshold and before the similarity becomes less than a second threshold smaller than the first threshold.

3. The translation device according to claim 2, wherein the matching unit ends calculation of the similarity when the similarity becomes less than the second threshold.

4. The translation device according to claim 1, further comprising a translation processor configured to translate into the second language without reference to the fixed phrase, a portion irrelevant to the fixed phrase in the text thus divided.

5. The translation device according to claim 1, wherein
the fixed phrase acquisition unit acquires another fixed phrase different from the fixed phrase, and
the matching unit calculates a similarity between each of the character strings and the other fixed phrase, and selects the fixed phrase when the maximum similarity of the fixed phrase is higher than a maximum similarity of the other fixed phrase.

6. The translation device according to claim 5, wherein the matching unit ends calculation of the similarity of the other fixed phrase when the similarity of the fixed phrase and the similarity of the other fixed phrase have a difference exceeding a predetermined value.

7. The translation device according to claim 1, wherein the fixed phrase acquisition unit acquires a plurality of fixed phrases including the fixed phrase, and
the matching unit adds a weight to the similarity in accordance with a length of each of the fixed phrases.

8. The translation device according to claim 1, wherein the fixed phrase acquisition unit acquires, as the fixed phrase, a fixed phrase adapted to a current scene among a plurality of fixed phrases.

9. The translation device according to claim 1, further comprising a fixed phrase storage configured to store the fixed phrase in the first language and the translation phrase in the second language.

10. A translation method comprising:
acquiring text in a first language, the text including a first letter as a head character;
generating a plurality of character strings from the acquired text, each of the plurality of character strings configuring at least part of the acquired text, a head character of each of the plurality of character strings being same as the head character of the acquired text;
outputting the plurality of character strings in order of character string length;
acquiring a fixed phrase in the first language associated with a translation phrase in a second language;
calculating a similarity between each of the character strings and the fixed phrase in order of the character string length;
dividing the text at a position achieving a maximum similarity among values of the similarity exceeding a first threshold; and
outputting the translation phrase as translation of the text thus divided, wherein
the plurality of character strings at least include:
a first character string that includes only the first letter of the acquired text;
a second character string that includes only the first character string and a second letter of the acquired text;
a third character string that includes only the second character string and a third letter of the acquired text; and
a fourth character string that includes only the third character string and a fourth letter of the acquired text, and
the calculating the similarity comprises calculating similarities between the first to the fourth character strings and the fixed phrase in order of the first to the fourth character strings.

* * * * *